United States Patent [19]

Watanabe

[11] Patent Number: 4,939,889
[45] Date of Patent: Jul. 10, 1990

[54] PACKAGE WRAPPING APPARATUS EQUIPPED WITH FILM HAULING DEVICE

[75] Inventor: Harumi Watanabe, Urawa, Japan

[73] Assignee: International Sankoh Kabushiki Kaisha, Omiya, Japan

[21] Appl. No.: 221,326

[22] Filed: Jul. 19, 1988

[51] Int. Cl.⁵ .................. B65B 9/06; B65B 51/30
[52] U.S. Cl. .................. 53/450; 53/550; 53/555
[58] Field of Search ........... 53/550, 552, 373, 555, 53/450, 568, 562, 548, 455

[56] References Cited

U.S. PATENT DOCUMENTS

| | | | |
|---|---|---|---|
| 3,385,028 | 5/1968 | Pierce | 53/373 |
| 3,494,096 | 2/1970 | Suzuki | 53/550 X |
| 3,665,673 | 5/1972 | Billett et al. | 53/555 X |
| 3,916,597 | 11/1975 | Martelli | 53/550 X |
| 4,185,443 | 1/1980 | Budzyn | 53/550 |
| 4,211,599 | 7/1980 | Bolter et al. | 53/373 X |
| 4,219,988 | 9/1980 | Shanklin et al. | 53/550 |
| 4,235,064 | 11/1980 | Wenger | 53/552 X |
| 4,494,362 | 1/1985 | Koch | 53/550 |
| 4,658,569 | 4/1987 | Hanagata | 53/550 |

Primary Examiner—Horace M. Culver
Attorney, Agent, or Firm—Robert E. Burns; Emmanuel J. Lobato

[57] ABSTRACT

This package wrapping apparatus is equipped with film hauling device.

This film hauling device comprises lower and upper conveyor belts which can catch selvage of film between those belts and unwind folded rolled film uniformly.

Furthermore one end of lower or upper conveyor belts can be opened or closed by hand and, also can be locked in the closed position by locking lever.

So if a piece of selvage of film is cut away, it can be removed from the above film hauling device easily by opening upper conveyor belt.

16 Claims, 10 Drawing Sheets

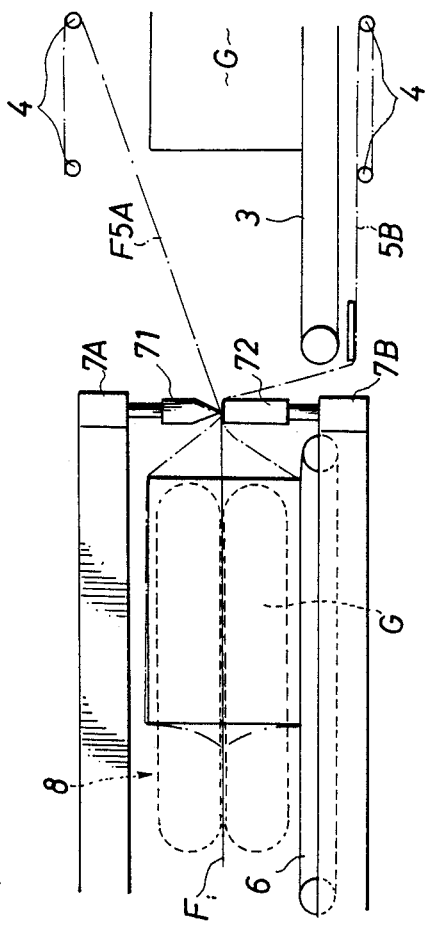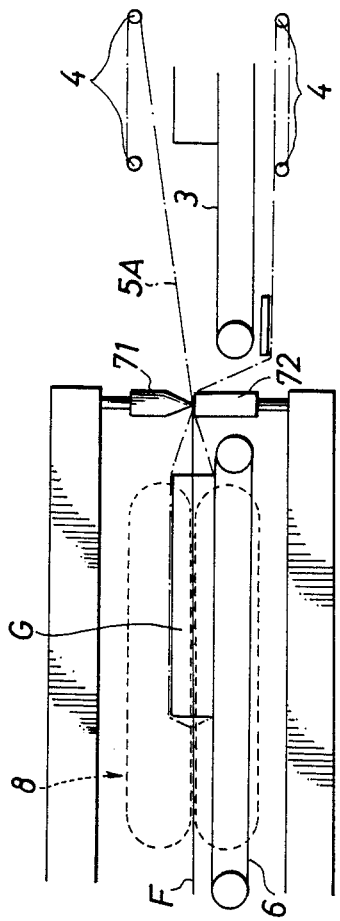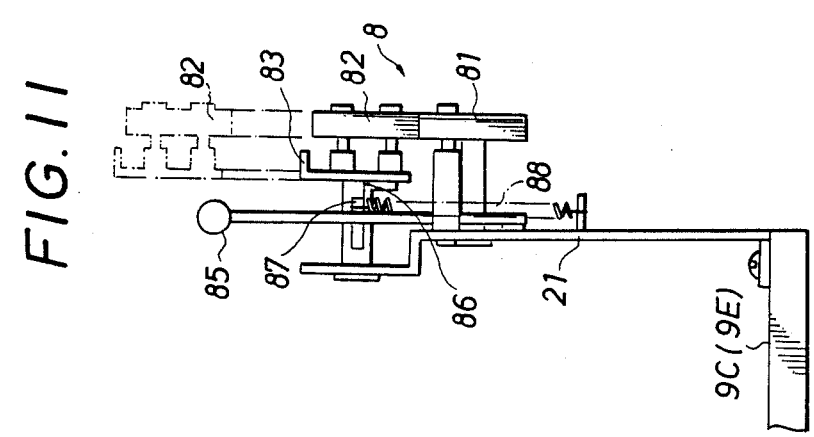
FIG. 12(a)
FIG. 12(b)
FIG. 11

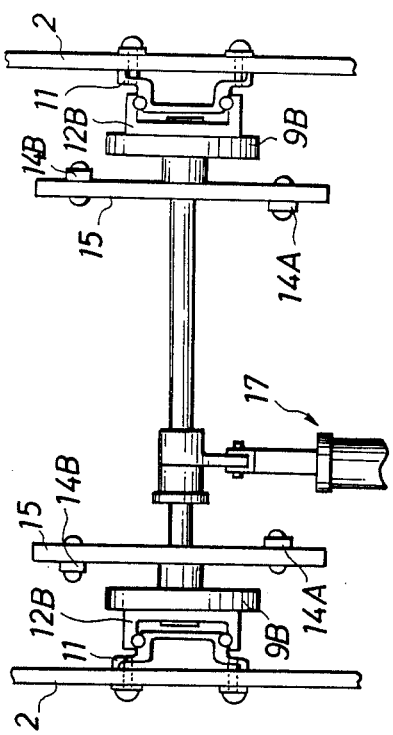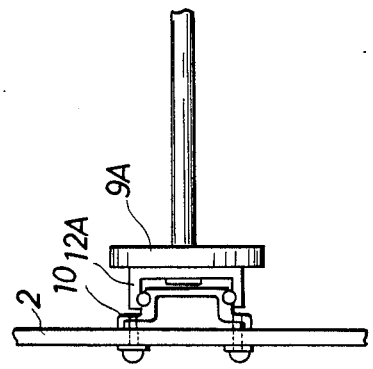

PACKAGE WRAPPING APPARATUS EQUIPPED WITH FILM HAULING DEVICE

BACKGROUND OF THE INVENTION

When a folded packaging film is cut off by an L-type sealer, in packaging apparatus it is required that a remaining selvage of the film is wound up or hauled by a vacuum source to prevent some problems, to await it becoming reattached to the folded packaging film, as stated in the U.S. Pat. No. 4,219,988.

Especially when a belt conveyor is used for an infeed conveyor to the packaging apparatus, a folded film is hauled out from a web by interference with the products or articles transported and with a preceding severed film portion.

Accordingly the folded packaging film will not be unwound uniformly.

So it is necessary for a package wrapping apparatus to be furnished with a device for hauling the remaining selvage of the packaging film.

In prior art of film hauling devices, a remaining selvage was wound up on a drum by means of clamping the selvage between upper and lower endless chains which are provided in a longitudinal direction in parallel to a discharge conveyor of the wrapping apparatus.

In this case it was required that the above endless chains be meshed with each other strongly by spring loaded action to clamp the selvage of the film.

So there was a problem that cut-away selvage could not be easily removed, since the above strongly meshed chains could not be opened easily.

Instead of the above constructions there are methods of sucking the severed selvage of the film by means of a vacuum source, however the folded packaging film can not be hauled out uniformly by this means.

SUMMARY OF THE INVENTION

The objects of the present invention are to provide a package wrapping apparatus equipped with a film hauling device which unwinds folded heat-sealable film and also a piece of cut-away or severed selvage of the film is easily removed from it.

BRIEF DESCRIPTION OF THE DRAWINGS

FIG. 11 is a side view of a film hauling device;

FIGS. 12(a) and 12(b) are diagrams for explaining the sealing for different height of articles or products to be packaged and FIGS. 13(a) and 13(b) are drawings showing the installation of linear ball bearings to the main frame.

DESCRIPTION OF THE PREFERRED EMBODIMENT

Figure 1:
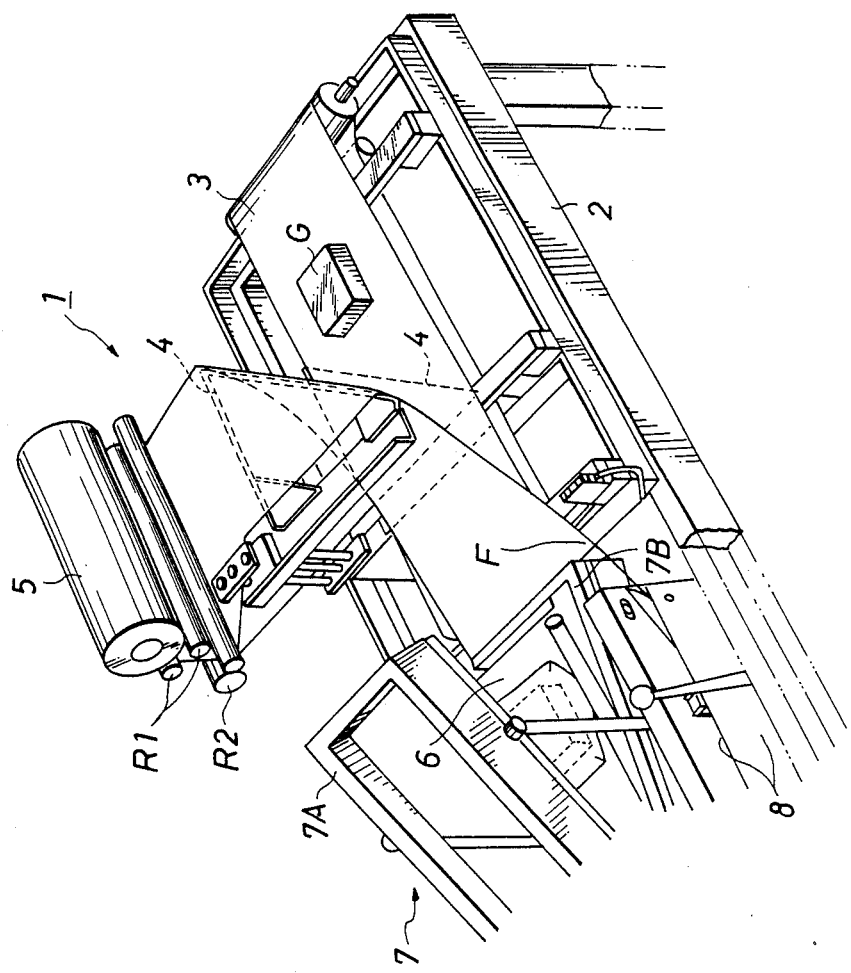
FIG. 1 is a fragmentary perspective view of the preferred embodiment of the package wrapping apparatus embodying the present invention.

FIG. 1 shows a fragmentary perspective view of a package wrapping apparatus embodying the present invention.

This package wrapping apparatus 1, as shown in FIG. 1, is provided with an infeed conveyor 3 in front of a frame 2 of the apparatus.

An upper and a lower film inverting head 4, 4, in the shape of triangular frames are fixed on two cross members 4A, 4B respectively, and the height of the film inverting heads 4, 4 can be adjusted.

The film inverting heads 4, 4 are composed of the same components as are used in Shanklin U.S. Pat. Nos. 358,388 and 4,219,988.

That is, a rolled folded heat sealable thermoplastic film 5 is placed on a pair of guide rollers R1, R1 which are located in parallel to the longitudinal direction of travel of the infeed conveyor 3, and the folded film is unwound to the lower direction through the guide rollers R1, R1.

The folded film is taken out in the longitudinal direction of travel of the infeed conveyor 3 through the guide rollers R2, R2 and through the clearance between the film inverting head 4, 4, and the two free edges of the inverted folded film are matched between a discharge conveyor 6 and the infeed conveyor 3.

The discharge conveyor 6 is provided so that it is extended in the same height and the same longitudinal direction of travel of the infeed conveyor 3.

A film hauling device 8, comprising a pair of upper and lower endless conveyor belts 81, 82 which haul out selvage of film and wind up the selvage on a drum, is provided on one side of the discharge conveyor 6.

A heat sealing section 7 is provided above the discharge conveyor 6.

The sealing section 7 is provided which seals the packages for articles by closing an upper heat sealing jaw 7A and a lower heat sealing jaw 7B.

The sealing section 7 comprises the upper heat sealing jaw 7A and a lower heat sealing jaw 7B of which one end is hinged to each other to allow the opening and the closing of the other end of the sealing jaws by linkage(long) 14A and linkage(short) 14B.

Figure 4:
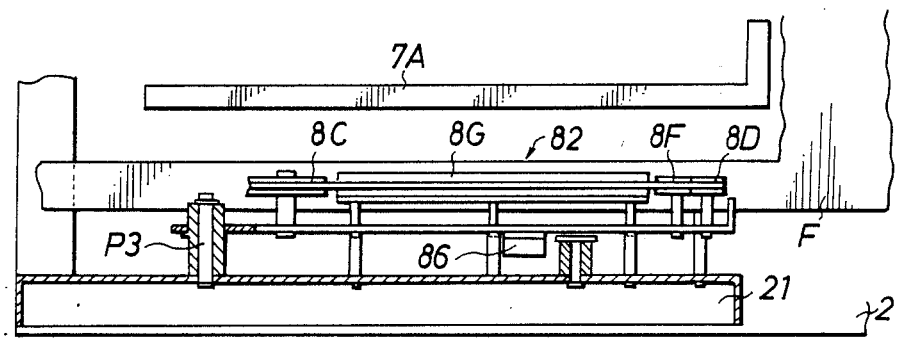
FIG. 4 is a top plan view of a film hauling device.
Figure 5:
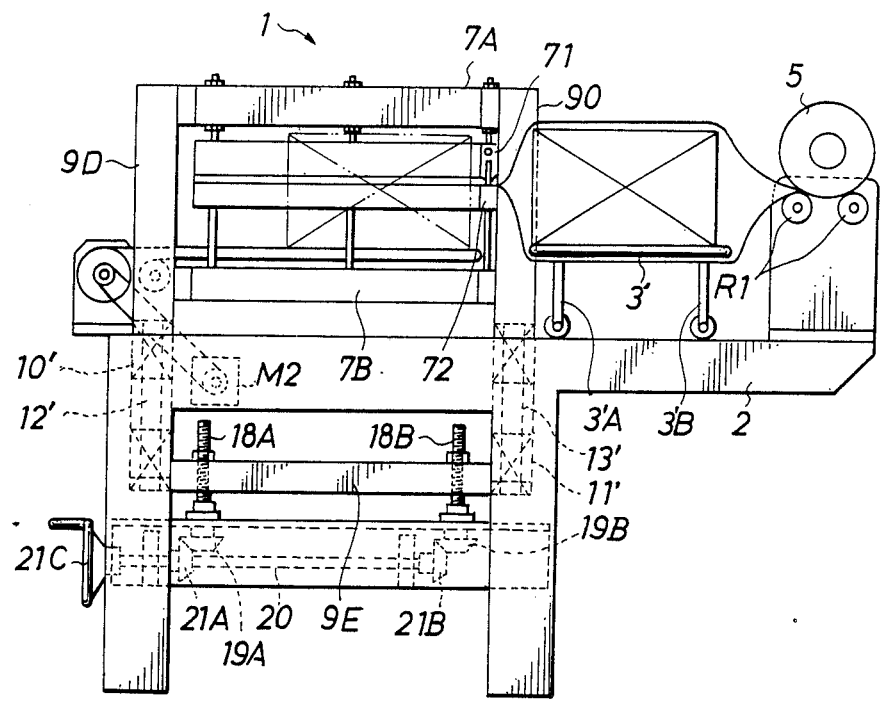
FIG. 5 is a top view showing a different embodiment of an infeed conveyor.
Figure 6:
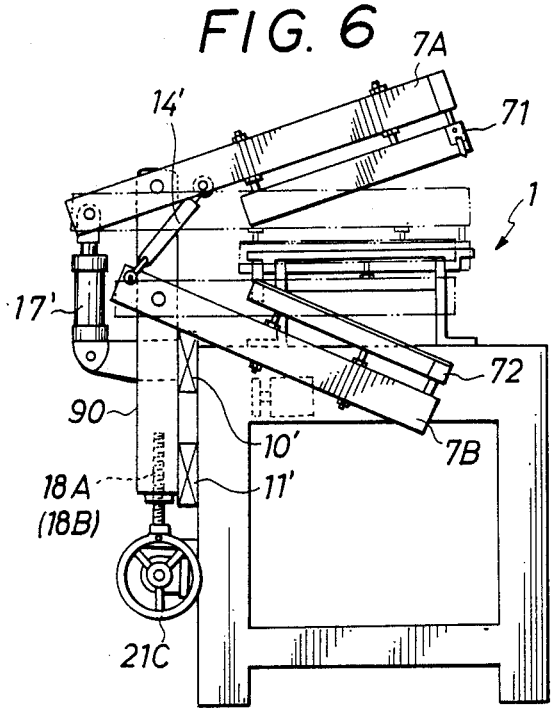
FIG. 6 is a side elevation view corresponding to FIG. 5.
Figure 7:
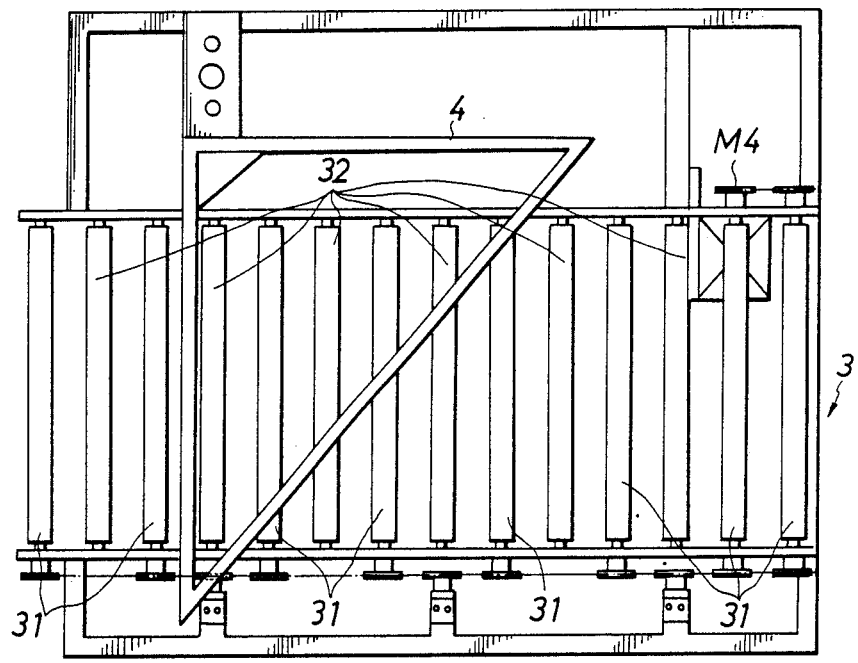
FIG. 7 is a diagram illustrating a different embodiment of a discharge conveyor.
Figure 8:
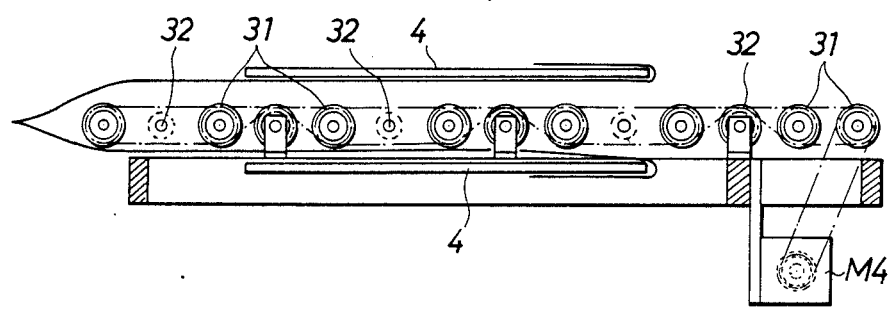
FIG. 8 is a sectional side view corresponding to FIG. 7.
Figure 9A:
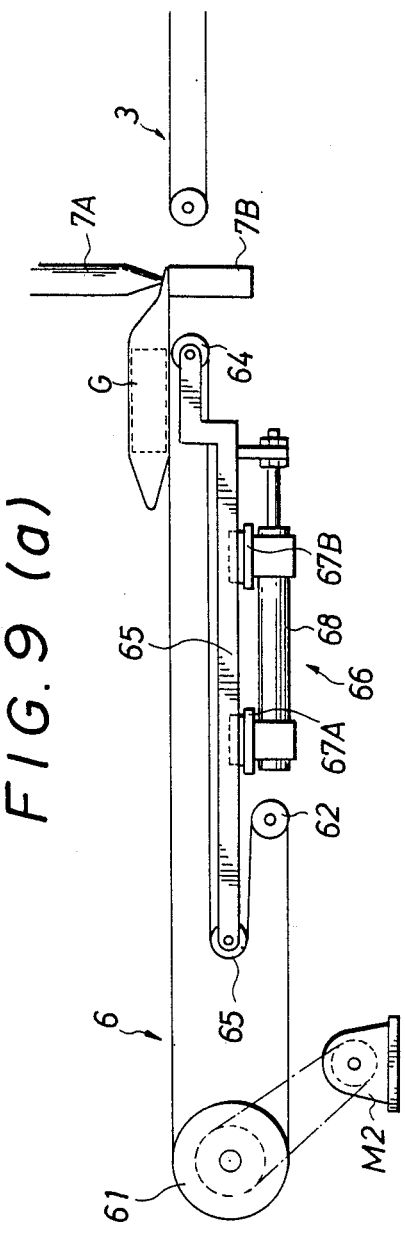
FIG. 9(a) shows a waiting position of a discharge conveyor according to the invention.
Figure 9B:
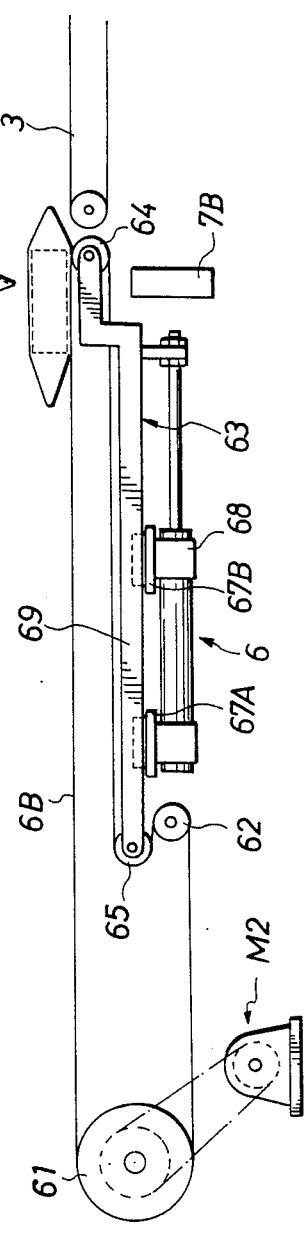
FIG. 9(b) shows an extended position of the discharge conveyor of FIG. 9(a)
Figure 10:
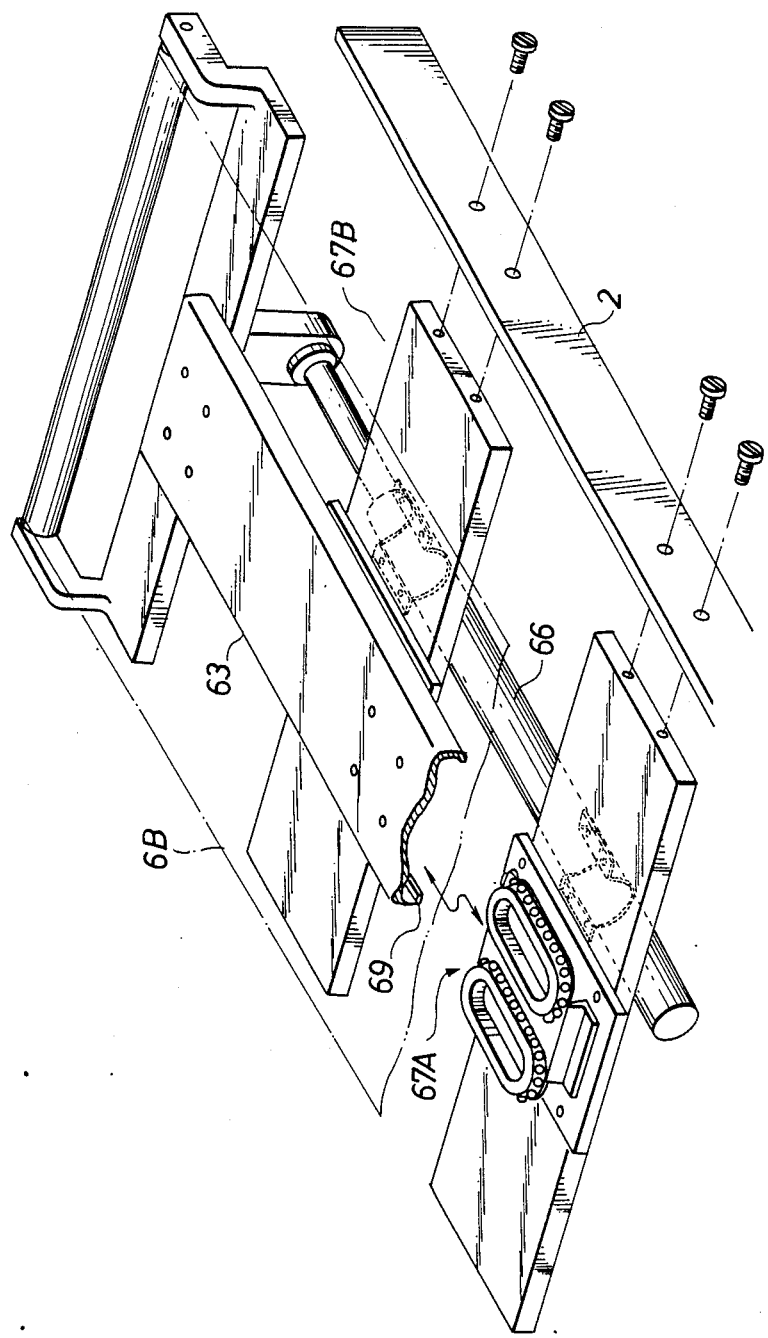
FIG. 10 is an enlarged perspective view of a main portion of the conveyor corresponding to FIG. 9.

At the other or free end of the upper sealing jaw 7A an L-shaped heating knife 71 enclosing a heater in it is installed, and an L-shaped rubber pad 72 is installed at the free end of the lower sealing jaw 7B in correspondence with the above L-shaped heating knife 71 (see FIG. 4).

A cross member 72, of the heat sealing section 7 is positioned between the infeed conveyor 3 and the discharge conveyor 6 when sealing products in a package.

Figure 2:
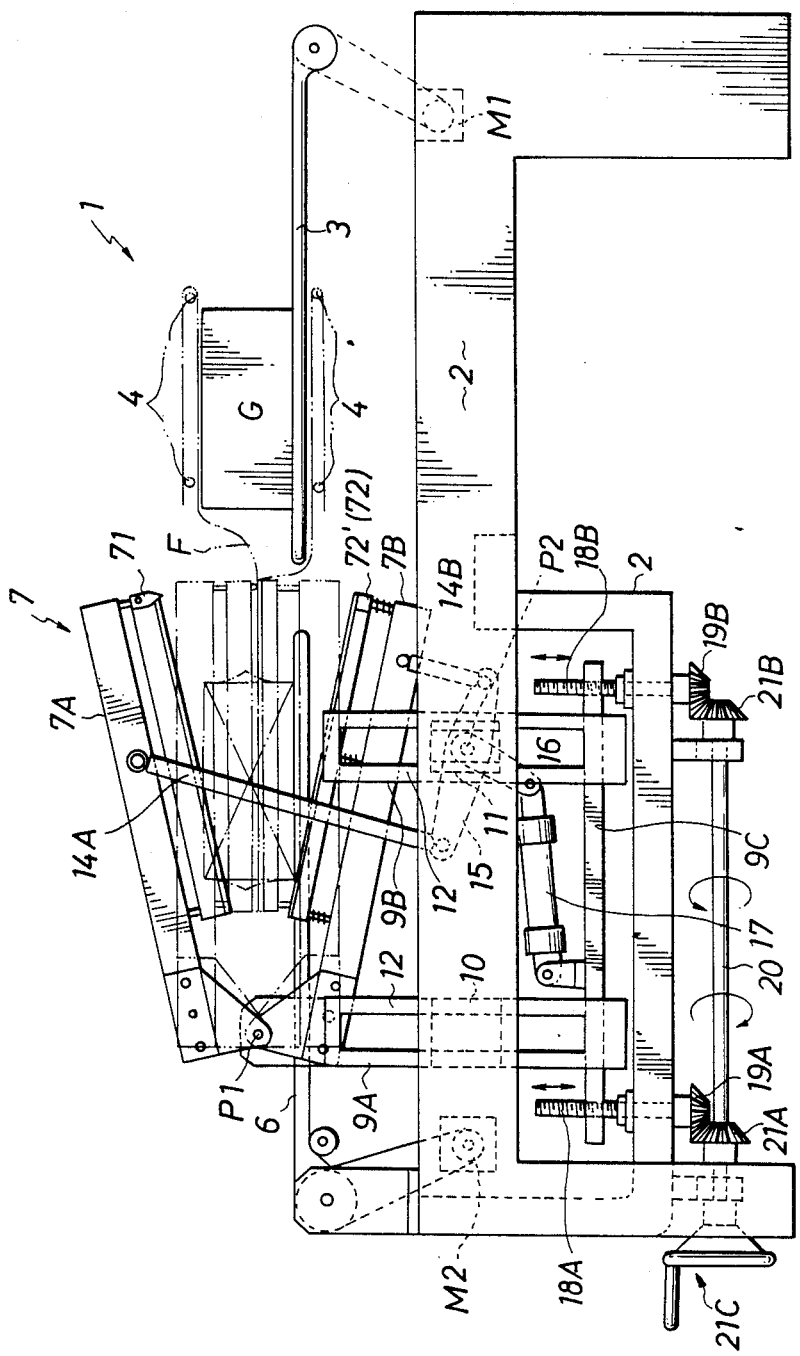
FIG. 2 is a side elevation view of the apparatus of FIG. 1.

In the present invention the heat sealing section 7 may be secured on the main frame 2, but the heat sealing section 7 is mounted on the main frame 2 so that it can be raised up and moved down in this embodiment as shown in FIG. 2.

Lower ends of two side plates 9A, 9B are installed on a support 9C through linear ball bearings 10, 10 secured on the main frame 2.

One end of linkage (long) 14A and linkage (short) 14B are pivotally mounted on the side of the upper sealing jaw 7A, and the other end of each of them are also pivotally mounted on the both ends of a link lever 15 respectively.

The center of link lever 15 is pivotally mounted on a pivot axis secured on the center of plate 9B.

One end of a connecting link 16 is secured in the center of link lever 15 at some angles, and the other end of connecting link 16 is linked with the rod of an air cylinder 17 of which a head end is pivotally mounted on the support 9C which supports plates 9A and 9B.

Accordingly when the air cylinder 17 is actuated, the link lever 15 rotates around a pivot axis P2, and linkages 14A and 14B allow the sealing jaws 7A and 7B to be opened or closed in correspondence with a sealing position or a waiting position respectively.

The sealing position is a closed position of the sealing jaws as shown in phantom in FIG. 2.

The waiting position is an opened position of the sealing jaws as shown in solid lines in FIG. 2.

This sealing device 7 is installed on the main frame 2 as shown in FIG. 2.

The above upper sealing jaw 7A and the lower sealing jaw 7B are pivoted together at a horizontal shaft P1 at the one end of them.

And a pair of side plates 9A, 9A which hold the horizontal shaft P1 are slidably mounted for movement in the vertical direction on both sides of the main frame 2.

Also a pair of side plates 9A, 9B are slidable mounted for movement in the vertical direction on both sides of the main frame 2.

On both sides of the main frame 2 four linear ball bearings 10, 11 having balls B are fixed to mate with each rail 12A, 12B of the side plates 9A, 9B for supporting the sealing section 7.

The sealing section 7 as noted above comprises an upper sealing jaw 7A provided with heater means and a lower sealing jaw 7B provided with a rubber pad.

These two jaws are pivotally mounted together on a shaft P1 which is supported on a pair of side plates 9A.

On the free end of both sides of the upper sealing jaw 7A and the lower sealing jaw 7B, long linkage 14A and short linkage 14B are pivotally mounted respectively.

Four threaded holes are provided at the four corners of the rectangular base plate 9C, and four jack screws 18A and 18B equipped with corresponding bevel gears 19A and 19B on their bottom ends are vertically screwed into those threaded holes to be supported on the main frame 2.

And these bevel gears mesh with other bevel gears installed on opposite ends of a bevel gear shaft 20 mounted pivotally and horizontally on the lower portion of the main frame 2.

On one end of the bevel gear shaft 20 a handle 21C is installed through the front surface of the main frame 2.

This bevel gear shaft 20 is rotated manually by the handle 21C in this embodiment, but it may be rotated automatically by means of an electric motor etc.

When the shaft 20 is rotated jack screws 18A and 18B are rotated through the bevel gears 19A, 19B meshing with the shaft bevel gears 21A, 21B.

Accordingly the plate 9C is elevated or lowered by turning the operating handle 21C.

As stated above side plates 9A, 9B to support the sealing section 7 and air cylinder 17 for controlling the opening and the closing of the sealing section 7 are installed on the base plate 9C, so the sealing section 7 is elevated or lowered as the back plate moves up or down.

According to this operation of going up and down, the sealing height in which a product G is sealed with the unwound folded film is adjusted to the proper height as shown in FIGS. 12(a) and 12(b).

M1 and M2 shown in FIG. 2 are electric motors for driving the conveyor 3 and 6.

The film hauling device 8 is installed on one side of the sealing section 7 in parallel to the longitudinal direction of the discharge conveyor 6.

The film hauling device 8 comprises a lower driving conveyor belt 81, an upper following conveyor belt 82, and a locking lever 85 which locks the upper following conveyor belt 82 to be in contact with the lower driving conveyor belt 81 or unlocks the contact.

For another embodiment the locking lever 85 may be replaced by some spring loaded hooks mounted on the side frame 21 or lower hauling belt side and a pin to be mated with said hook.

The driving conveyor belt 81 which travels over the pulleys 8A, 8B is driven by the drive pulley 8A which is driven by means of an electric motor M3.

The belt drive pulley 8A and the driven pulley 8B are pivotally mounted through pulley shafts on the side frame 21 secured on one side of the main frame 2.

A lower belt supporting plate 8F secured on the side frame 21 extends inward horizontally to support the back of the upper side or run of the belt.

A following conveyor belt 82 travels over the pulleys 8C, 8D, 8E which are pivotally mounted through pulley shafts on a side cover 83 covering one side of the follower belt 82.

The lower side of the belt of the upper following conveyor belt 82 can be in contact with the upper side of the lower driving conveyor belt of 81. Also the upper belt supporting plate 8F is provided to keep the plane traveling of lower side of the belt.

Furthermore one end of a side cover 83 is pivotally mounted on a pivot shaft P3 secured on the side frame 21 so that the other end of the side cover 83 can be turned up or down in the center of the pivot shaft P3.

Both the driving conveyor belt 81 and the following conveyor belt 82 are composed of endless rubber belts with outside surfaces with indentations in order to provide friction to them when those surfaces catch or change the selvage of film so that the rolled folded film 5 will be unwound easily by hauling the selvage of film steadily.

Upper and lower hauling belts 81, 82 may be spring loaded biased toward the opening direction to allow the easy opening of the conveyer belts.

A bracket 86 which is of L-shape section is secured on the outside of the side cover 83, and the bottom end of the locking lever 85 is pivotally mounted on the outside of the main frame 2.

The locking lever 85 is equipped with a knob on the top and at locking pin 87 in the middle of it, and it is operated manually.

One end of an extending recoil spring 88 is installed on the locking pin 87 and the other end is installed on the main frame 2 under the bottom end of the locking lever 85.

To stop the rotation of the locking lever 85 in the unlocking direction, a stop pin 89 is secured on the outside of the side frame 21.

Figure 3:
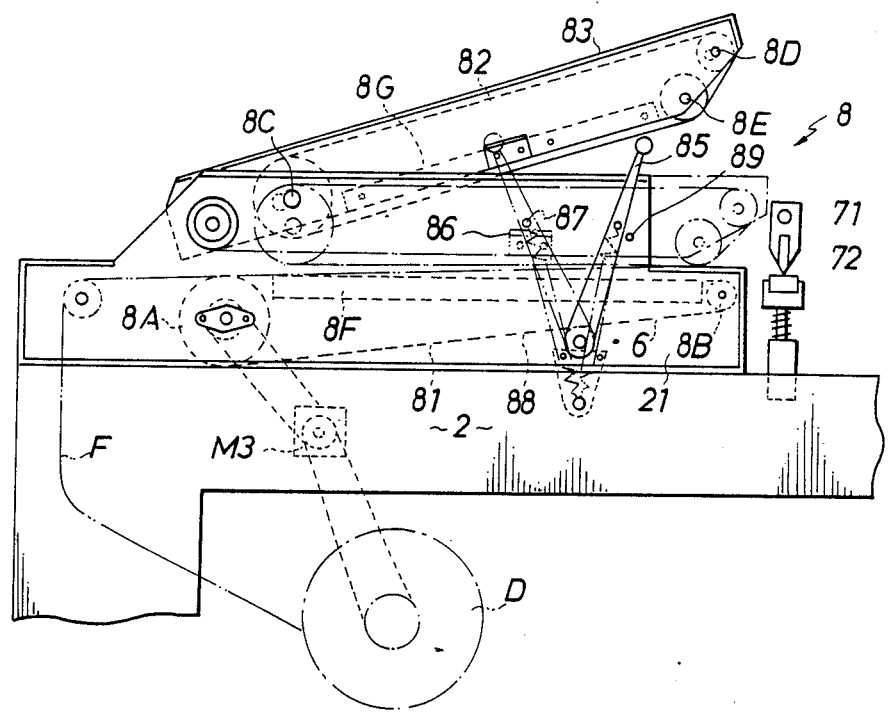
FIG. 3 is a side view of a film hauling device.

For stopping the locking lever 85 to the rocking direction the above bracket 86 is used as well as the locking of the lever. But the stop pin (not shown in FIG. 3) may be installed on the side frame 21 in addition to the bracket 86.

Since the film hauling device 8 is composed of the above components, it can catch the selvage of the film between endless belts 81 and 82 by turning of the locking lever 85 to the locking position and by locking the locking pin 87 by the bracket 86.

Since the locking lever 85 is loaded by the extending recoil spring 88 to the locking direction, selvage F of film inserted between the above belts is depressed by the specified stress of them, and it is hauled out by running the lower driving conveyor belt 81.

When the locking lever 85 is turned to the unlocking direction, the spring loaded locking lever 85 is held against the stop pin 89.

The following conveyor belt 82 can be opened by hauling it upward so that the selvage F of the film can be caught or released easily.

Furthermore the selvage F of the film which is derived out through the belts 81 and 82, is wound up on the rotating drum D provided under the main frame 2.

The film hauling device 8 is fixed on the main frame 2, however this device may be composed of components which are raised up or down in relation to the main frame 2 with the sealing section 7.

I claim:

1. A film wrapping apparatus for wrapping articles in packages of a heat-sealable thermoplastic packaging film comprising, a film-hauling device having traveling clamping runs of upper and lower endless belts for clamping a marginal selvage of a part of a folded strip of said packaging film and advancing it longitudinally, an infeed device for positioning articles successively at a position in which longitudinal superposed parts of the folded packaging film travel respectively over and under the articles for enveloping the articles successively and packaging the articles in corresponding successively formed film packages along a path of travel of the packaging film, a heat-sealing device having an upper and a lower jaw operable to an open position for allowing successive lengths of the folded packaging file to successively advanced thereinto and operable to a closed position for the jaws effecting heat sealing of the folded packaging film transversely across substantially the entire width along successive lengths of the film and simultaneously severing the corresponding sealed ends of successive film packages corresponding to successive lengths of the film advanced to define the individual film packages with corresponding articles therein, the jaws having heat-sealing means for sealing in said closed position free sides of overlapping parts of the folded film along the length of the corresponding individual lengths of film defining individual packages and for simultaneously severing the marginal selvage corresponding to the individual lengths of film defining corresponding film packages with articles therein, means for intermittently rolling up the severed marginal selvage in a roll as received intermittently from the film-hauling device, and a discharge conveyor for receiving the successive film packages with articles therein after each successive sealing of a leading end of a corresponding film package and discharging successively the complete packages when corresponding trailing ends thereof are heat sealed and severed.

2. A film wrapping apparatus for wrapping articles according to claim 1, in which said control means comprises a manually operated operating lever operable at will to a first position in which the endless belts are engaged and effect clamping of said marginal selvage and intermittently advance the film therebetween and operable to a second position for disengaging the endless belts and releasing the film clamped between the clamping runs of said belts, and means for driving the driven belt intermittently for advancing the folded package film lengths successively to the heat-sealing device for effecting said sealing and severing of the packaging film by said heat-sealing device.

3. A film wrapping apparatus for wrapping articles according to claim 2, in which said film-hauling device comprises a conveyor having said upper and lower endless belts, means for biasing the drive endless belt into engagement with the driven endless belt, and in which said operating lever is manually operated to said second position in which the means for biasing is overcome and the drive belt is disengaged from the driven belt.

4. A film wrapping apparatus for wrapping articles according to claim 3, in which said means for biasing comprises biasing means for biasing the operating lever to said first position thereof.

5. A film wrapping apparatus for wrapping articles according to claim 4, including lock means on said film-hauling device and said lever for releasably locking said operating lever in said second position.

6. A film wrapping apparatus for wrapping articles according to claim 5, in which said operating lever effects movement of the upper endless belt upwardly when moved angularly to said second position.

7. A film wrapping apparatus for wrapping articles according to claim 1, further including means to raise and lower the film lengths in dependence upon the level of the infeed device.

8. A film wrapping apparatus for wrapping articles according to claim 1, in which one of the endless belts of said film-hauling device is a drive endless belt and another is the driven endless belt, and control means in said film-hauling device for engaging and disengaging the endless belts to effect driving of the driven belt by the drive belt.

9. A film wrapping apparatus for wrapping articles according to claim 1, in which said discharge conveyor comprises a variably extendable endless belt for variably changing a width of a gap between the infeed conveyor and the discharge conveyor.

10. A film wrapping apparatus for wrapping articles according to claim 9, in which said discharge conveyor comprises a variably positionable guide roller over which the endless belt travels thereby variably extending length of the discharge conveyor.

11. A film wrapping apparatus according to claim 1, in which said film-hauling device is disposed alongside said discharge conveyor and extends longitudinally in a longitudinal direction of travel of the discharge conveyer.

12. A film wrapping apparatus for wrapping articles according to 8, in which said jaws of said heat-sealing device comprise L-shaped heating elements having transverse bars having coactive sealing elements which effect the end seals of the lengths of film and corresponding packages along a gap defined between the infeed conveyor and the discharge conveyor.

13. A method of packaging articles in respective packages of a heat-sealable thermoplastic packaging film comprising, positioning articles successively at a position for packaging thereof in a respective packaging film package, clamping a lower part of a folded strip of heat-sealable packaging film and intermittently advancing the folded film with successive lengths thereof having parts superposed longitudinally, while advancing the folded film enveloping the articles successively at said position by passing individual successive lengths of the folded film parts respectively over and under the respective articles to be packaged in each corresponding length of folded film, while the articles are at said position heat sealing a leading end of each successive length and simultaneously heat sealing a trailing end of a next adjacent length downstream of the leading end of the successive lengths of folded film to effect a transverse seal and simultaneously severing the folded film at said seal transversely substantially to the marginal selvage being clamped, after effecting each said transverse seal advancing the folded film lengths longitudinally successively downstream from said position with a respective article enveloped therein, while effecting each transverse seal simultaneously heat sealing an open side of a corresponding folded film length and severing from the marginal selvage the respective length of folded film downstream of each transverse seal effected to successively form individual film packages sealed at opposite ends and along one side with respective articles therein, and completely severed from the marginal selvage of the folded film and the selvage film maintained continuous in length, and continuing intermittently advancing the folded film strip to effect packaging of the articles and simultaneously taking-up the severed marginal selvage on a roll and removing packaged articles.

14. A method of packaging articles in respective packages of a heat-sealable thermoplastic packaging film according to claim 13, including advancing the successive lengths of the folded film at a level in dependence upon the height of the articles above said position.

15. A method of packaging articles in respective packages of a heat-sealable thermoplastic packaging film according to claim 13, in which the heat sealing and severing of each leading end of each successive length and heat sealing of the open sides of the film lengths and severing takes place at a level determined by the first-mentioned level dependent upon the height of the articles above said position.

16. A method of packaging articles in respective packages of a heat-sealable thermoplastic packaging film according to claim 13, in which the first-mentioned level and the second-mentioned level are variably established at will manually and maintained at will.

* * * * *